US009268980B2

(12) United States Patent
Tsuchida et al.

(10) Patent No.: US 9,268,980 B2
(45) Date of Patent: Feb. 23, 2016

(54) WIRELESS TAG COMMUNICATION DEVICE AND WIRELESS TAG COMMUNICATION PROGRAM

(71) Applicant: TOSHIBA TEC KABUSHIKI KAISHA, Shinagawa-ku, Tokyo (JP)

(72) Inventors: Sunao Tsuchida, Shizuoka-ken (JP); Kouichi Sano, Shizuoka-ken (JP); Jun Yaginuma, Shizuoka-ken (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 36 days.

(21) Appl. No.: 14/449,331

(22) Filed: Aug. 1, 2014

(65) Prior Publication Data

US 2015/0035651 A1    Feb. 5, 2015

(30) Foreign Application Priority Data

Aug. 5, 2013 (JP) ................. 2013-162237

(51) Int. Cl.
*H04Q 5/22* (2006.01)
*G06K 7/10* (2006.01)

(52) U.S. Cl.
CPC ........ *G06K 7/10217* (2013.01); *G06K 7/10089* (2013.01)

(58) Field of Classification Search
None
See application file for complete search history.

(56) References Cited

U.S. PATENT DOCUMENTS

| | | | | | |
|---|---|---|---|---|---|
| 4,217,588 | A | * | 8/1980 | Freeny, Jr. | G01S 5/14 340/988 |
| 6,922,173 | B2 | * | 7/2005 | Anderson | G06K 7/0008 340/5.92 |
| 7,154,283 | B1 | * | 12/2006 | Weakley | G01R 29/08 324/756.01 |
| 7,319,396 | B2 | * | 1/2008 | Homanfar | A61B 6/14 340/572.1 |
| 7,423,606 | B2 | * | 9/2008 | Knadle, Jr. | G06K 7/0008 235/462.46 |
| 7,843,347 | B2 | * | 11/2010 | Nikitin | H01Q 1/2208 340/10.1 |
| 2005/0052283 | A1 | * | 3/2005 | Collins | G06K 19/07767 340/572.7 |
| 2006/0012387 | A1 | * | 1/2006 | Shanks | G01R 31/3025 324/754.21 |
| 2006/0131412 | A1 | * | 6/2006 | O'Brien | G07C 9/00103 235/451 |
| 2007/0018831 | A1 | * | 1/2007 | Shanton | G06K 7/0095 340/572.7 |
| 2007/0296582 | A1 | * | 12/2007 | Rofougaran | G06K 19/0723 340/572.1 |
| 2007/0296583 | A1 | * | 12/2007 | Rofougaran | G06K 19/0723 340/572.1 |
| 2009/0073070 | A1 | * | 3/2009 | Rofougaran | H04B 5/0012 343/793 |

(Continued)

FOREIGN PATENT DOCUMENTS

| | | |
|---|---|---|
| JP | 2007-088743 | 4/2007 |
| JP | 2011-237941 | 11/2011 |
| JP | 2014-049012 | 3/2014 |

*Primary Examiner* — Ojiako Nwugo
(74) *Attorney, Agent, or Firm* — Turocy & Watson, LLP

(57) ABSTRACT

According to one embodiment, a wireless tag communication device which communicates with a wireless tag includes a communication unit that designates a target wireless tag to read tag information stored in the wireless tag; a read-state determination unit that determines a read state of the tag information read by the communication unit; an output adjustment unit that varies a radio wave output to be transmitted to the wireless tag in response to the result of the determination by the read-state determination unit; a signal strength detection unit that detects the signal strength of a reply signal received from the wireless tag via the communication unit; and a control unit that switches the operation mode of the communication unit between a long-distance mode to communicate with the wireless tag while the output adjustment unit varies the radio wave output and a near-field mode to communicate with the wireless tag while the signal strength detection unit detects the signal strength.

6 Claims, 11 Drawing Sheets

(56) References Cited

U.S. PATENT DOCUMENTS

| | | | |
|---|---|---|---|
| 2009/0167502 A1* | 7/2009 | Erickson | G06K 7/0008 340/10.3 |
| 2009/0256672 A1* | 10/2009 | Yamamoto | G06Q 10/08 340/5.2 |
| 2010/0127828 A1* | 5/2010 | Connolly | G06K 7/0008 340/10.1 |
| 2010/0328038 A1* | 12/2010 | Kato | G06K 7/10356 340/10.1 |
| 2011/0304497 A1* | 12/2011 | Molyneux | A43B 1/0054 342/42 |
| 2012/0032675 A1* | 2/2012 | MacLeod | G01V 3/38 324/300 |
| 2012/0050017 A1* | 3/2012 | Barry | G06K 7/0008 340/10.1 |
| 2012/0118952 A1* | 5/2012 | Norair | G06K 19/07769 235/380 |
| 2012/0133488 A1* | 5/2012 | Choi | G06K 7/10079 340/10.1 |
| 2013/0093569 A1 | 4/2013 | Sano et al. | |
| 2013/0297387 A1* | 11/2013 | Michael | G08G 1/0112 705/13 |
| 2013/0320087 A1* | 12/2013 | Moran | G06K 19/06037 235/440 |
| 2014/0077933 A1* | 3/2014 | Yang | G06K 7/10237 340/10.1 |
| 2014/0139324 A1 | 5/2014 | Sano et al. | |
| 2015/0310240 A1* | 10/2015 | Sharma | G06K 19/0723 340/8.1 |

* cited by examiner

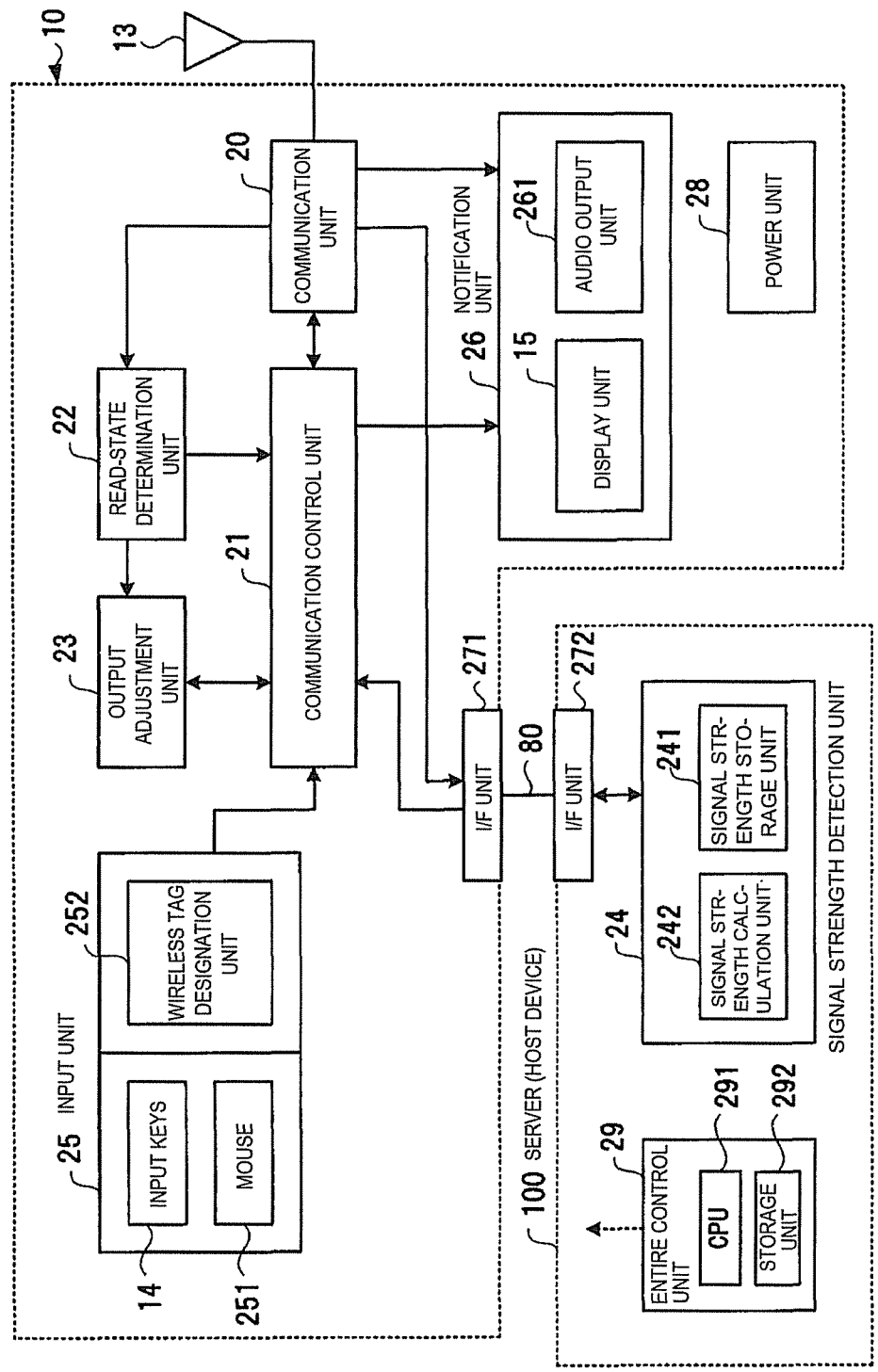

WIRELESS TAG COMMUNICATION DEVICE AND WIRELESS TAG COMMUNICATION PROGRAM

CROSS-REFERENCE TO RELATED APPLICATION

This application is based upon and claims the benefit of priority from Japanese Patent Application No. 2013-162237, filed Aug. 5, 2013; the entire contents of which are incorporated herein by reference.

FIELD

Embodiments described herein relate generally to a wireless tag communication device and a wireless tag communication program which enable contactless communication with a wireless tag.

BACKGROUND

In recent years, the wireless tag system is attracting the attention of users. The wireless tag system is a system in which a wireless tag including an IC chip and an antenna is mounted to an article, and ID information stored in a memory of the IC chip is contactlessly read by a wireless tag communication device.

In an exemplary system using the wireless tag, the wireless tag holding an individual ID is attached to the article. The wireless tag communication system is used to search for a specific wireless tag within an area with a plurality of such articles.

As a method for searching the wireless tag, JP-A-2007-088743 discloses a wireless tag information reading device. This wireless tag information reading device communicates with a wireless tag using a wireless communication unit to obtain tag identification information of the target wireless tag. Then, the device controls the transmission output of the wireless tag information reading device to increase/decrease the communication distance, and tries to obtain the tag identification information using the wireless communication unit once again. The device detects the location of the wireless tag by repeating these operations.

JP-A-2007-088743 thus describes a method for detecting the location of the wireless tag by adjusting the transmission output. However, when the wireless tag is located several 10 cm or less from the device and the transmission output is set to a minimum output sufficient for reading the information of the wireless tag, this method might read information of a wireless tag other than the target wireless tag, affected by the type of the tag or installing environment, in spite of the immediate vicinity of the target tag. That is, the method might recognize a wrong tag as the target wireless tag.

DESCRIPTION OF THE DRAWINGS

FIG. 7 illustrates a flow chart of operation in a long-distance mode when the wireless tag is searched for.

FIG. 8 illustrates a flow chart of operation in a near-field mode when the wireless tag is searched for.

FIG. 11 illustrates a block diagram of an electrical configuration of a wireless tag communication system related to a second embodiment.

DETAILED DESCRIPTION

In general, according to one embodiment, an object is to provide a wireless tag communication device and a wireless tag communication program which assist search for a target wireless tag as the distance to the wireless tag diminishes until the wireless tag is identified.

A wireless tag communication device related to an exemplary embodiment includes a communication unit that designates a target wireless tag to read tag information stored in the wireless tag; a read-state determination unit that determines a read state of the tag information read by the communication unit; an output adjustment unit that varies a radio wave output to be transmitted to the wireless tag in response to the result of the determination by the read-state determination unit; a signal strength detection unit that detects the signal strength of a reply signal received from the wireless tag via the communication unit; and a control unit that switches the operation mode of the communication unit between a long-distance mode to communicate with the wireless tag while the output adjustment unit varies the radio wave output and a near-field mode to communicate with the wireless tag while the signal strength detection unit detects the signal strength.

The embodiments will be described hereinafter referring to drawings. In drawings, the same reference symbols will be assigned to the same components.

First Embodiment

Figure 1A:
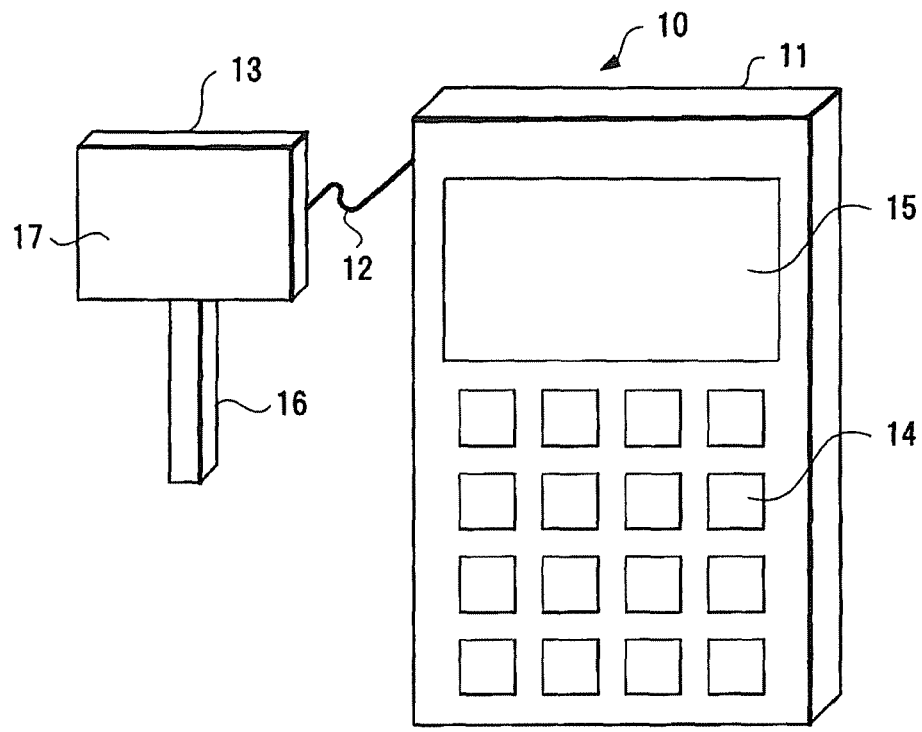
FIGS. 1A and 1B illustrate a perspective view of a whole of a wireless tag communication device related to an embodiment, and a cross-sectional view of an antenna.

FIG. 1A is a perspective view of a wireless tag communication device 10 related to a first embodiment. The wireless tag communication device 10 includes a main body 11, and an antenna 13 which is connected to the main body 11 via an antenna cable 12.

The main body 11 includes an input key 14 that allows a user to input, and a display unit 15 that displays operations to be executed, a communication device state, a communication result, etc. The antenna 13 includes a grip 16 and a housing 17. The grip 16 is a handle for the user to hold the antenna. Moreover, the antenna 13 and the main body 11 may be integrally connected.

Figure 1B:
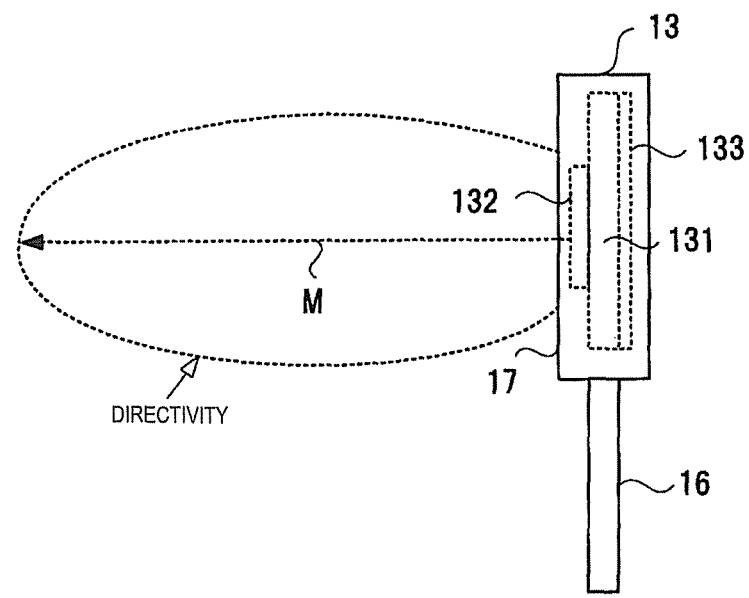

FIG. 1B is a cross-sectional view of an exemplary configuration of the antenna 13. The antenna 13 is a planar patch antenna which is provided with a radiator 132 on one surface of a plate-like dielectric 131, and a ground plane (GND) 133 on the other surface. The antenna 13 has a directivity with a maximum gain M in an approximately vertical direction with respect to the center of the one surface. This wireless tag communication device 10 designates any one of a plurality of wireless tags present within a given area and communicates with it. Wireless tag is also called "RFID (Radio Frequency Identification) tag".

Such wireless tags are attached to articles such as commodities and machines, which are present within the given area. A storage unit in each wireless tag stores ID information (tag information) for identifying the wireless tag. Wireless tag will be simply called as tag hereinafter.

Figure 2:
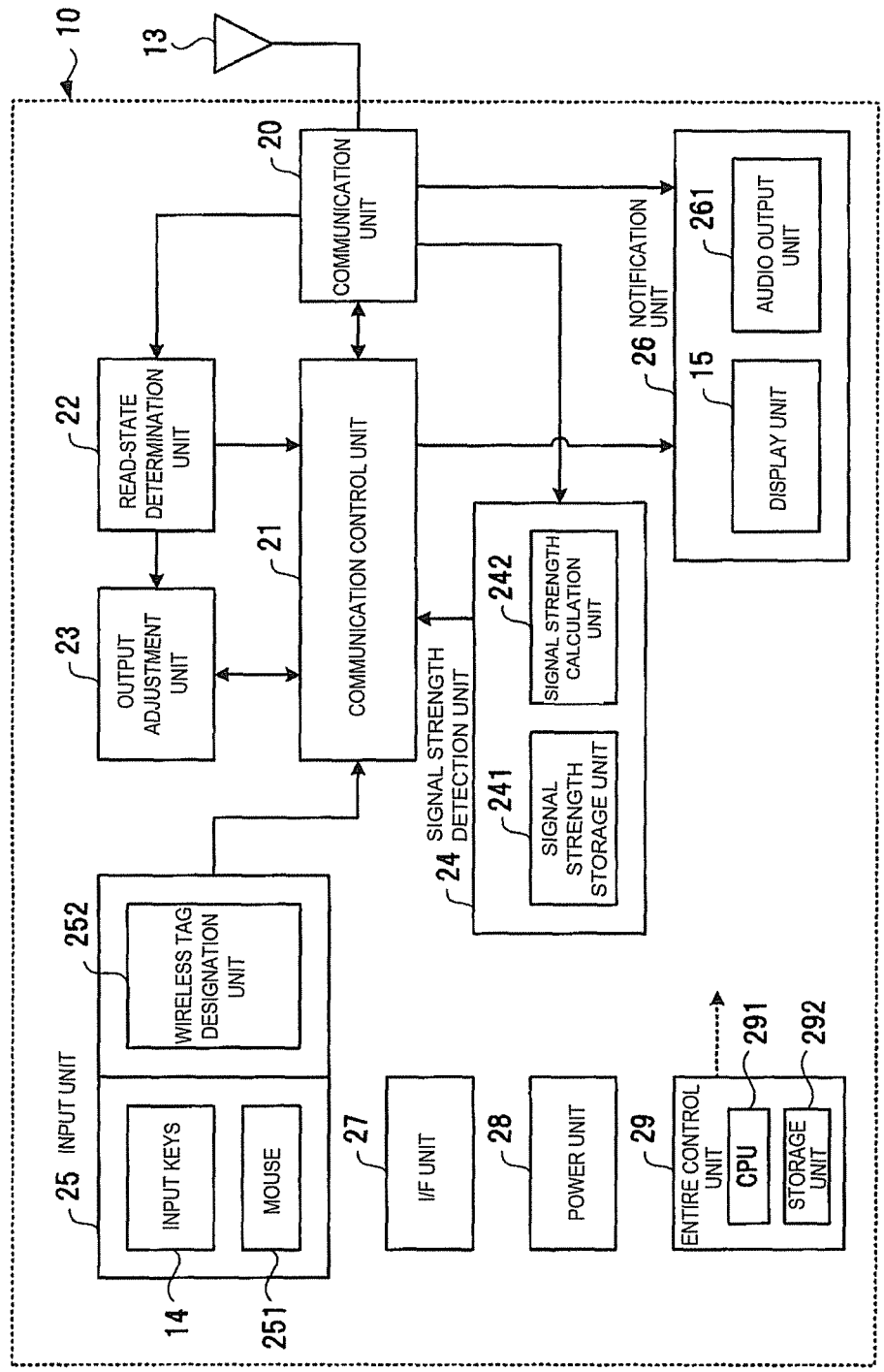
FIG. 2 illustrates a block diagram of an electrical configuration of the wireless tag communication device.

FIG. 2 is a block diagram of an electrical configuration of the wireless tag communication device 10 related to the first embodiment. The wireless tag communication device 10 includes the antenna 13, a communication unit 20 that communicates with the wireless tag via the antenna 13, and a communication control unit 21 that controls the communication unit 20. The communication control unit 21 is connected to a read-state determination unit 22 that detects and determines a read state from a communication result between the antenna 13 and the wireless tag; an output adjustment unit 23 that determines transmission power to be transmitted from the antenna 13 based on the result of the determination; and a signal strength detection unit 24 that detects the received signal strength indicator (RSSI) of a signal received from the wireless tag via the antenna 13.

The communication control unit 21, which corresponds to a control unit, transmits a control signal in response to the transmission power determined by the output adjustment unit 23 to the communication unit 20, and controls the switch of the operation mode of the communication unit 20 between a long-distance mode and a near-field mode, which will be described below, based on the read state, the transmission power and the signal strength.

The signal strength detection unit 24 is connected to the communication unit 20, and includes a signal strength calculation unit 241 and a signal strength storage unit 242. The signal strength storage unit 242 is composed of a memory circuit, and stores the signal strength chronologically. The signal strength calculation unit 241 calculates the difference Drssi between the maximum signal strength and the minimum signal strength from the signal intensities stored in the signal strength storage unit 242 during a predetermined period.

The communication control unit 21 is further connected with an input unit 25 and a notification unit 26. The input unit 25 includes input keys 14, a mouse 251 and a wireless tag designation unit 252. The wireless tag designation unit 252 designates the wireless tag for which the communication is performed. The user allows the wireless tag designation unit 252 to designate the wireless tag and a threshold by inputting with the input keys 14 or the mouse 251. The notification unit 26 includes the display unit 15 and an audio output unit 261, and displays the read state of the wireless tag, etc. on the display unit 15 to notify the user of it. The audio output unit 261 makes a sound when the tag information of the wireless tag is read or when a predetermined state is achieved.

The wireless tag communication device 10 further includes an interface (IF) unit 27 that communicates with a host device such as a computer, a power unit 28 that supplies power to each unit of the wireless tag communication device 10, and an entire control unit 29 that controls each unit of the wireless tag communication device 10. The power unit 28 includes a battery and a control circuit that controls charge and discharge of the battery. The power unit 28 supplies power to each of the units.

The entire control unit 29 includes a CPU 291 that controls each unit. The entire control unit 29 constitutes the computer, and controls each unit of the wireless tag communication device 10, such as the communication control unit 21, to control the whole of the wireless tag communication device 10. Moreover, the entire control unit 29 includes a storage unit 292 composed of a ROM (Read Only Memory) and a RAM (Random Access Memory). The ROM of the storage unit 292 stores in advance a program and setting data used by the entire control unit 29, etc. Variable data is temporality written to the RAM by the entire control unit 29. For an easy-to-read drawing, a line or an arrow indicating a control line from the entire control unit 29 is omitted.

Figure 3:
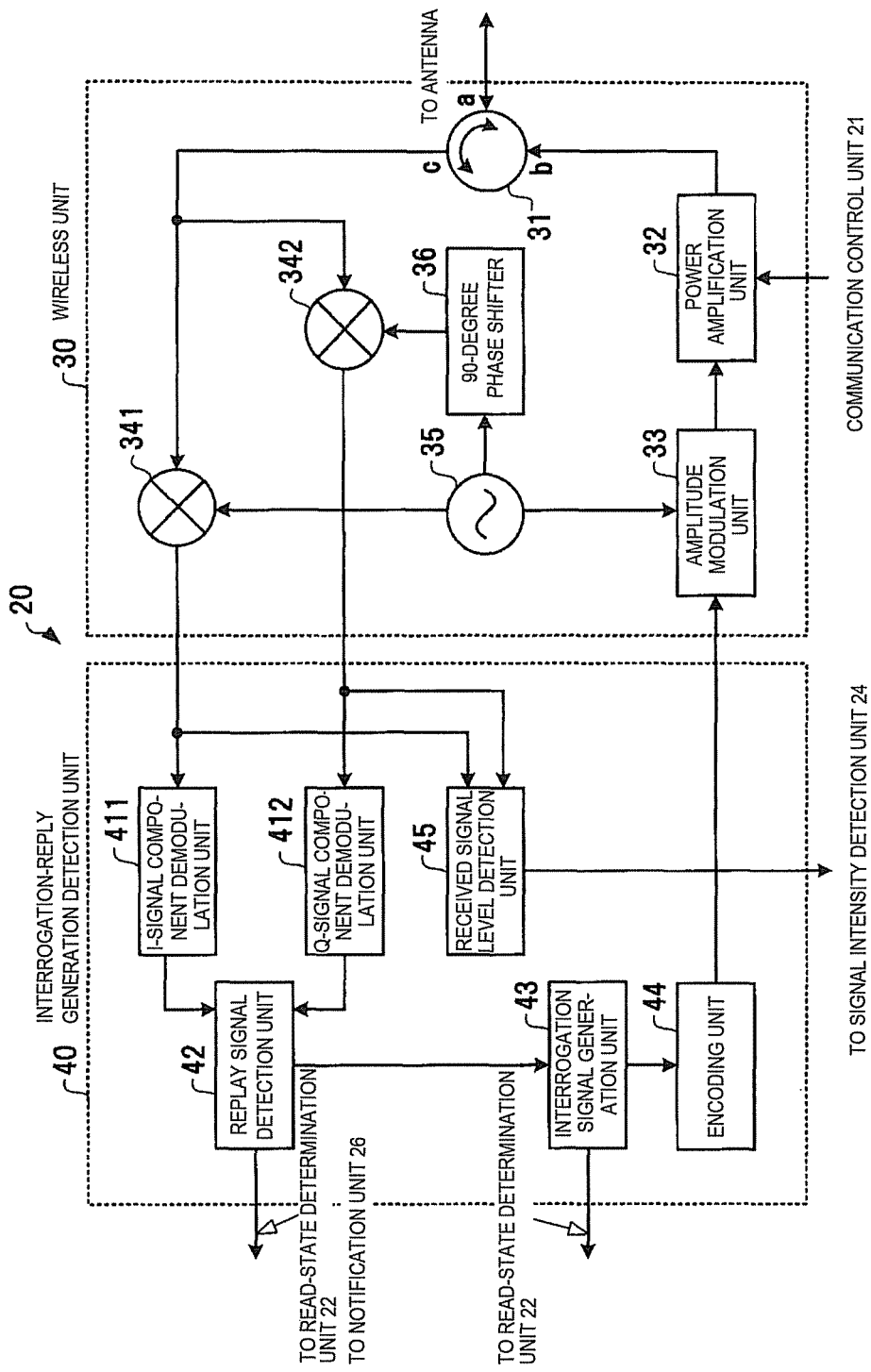
FIG. 3 illustrates a block diagram of an exemplary configuration of a communication unit in the embodiment.

FIG. 3 is a block diagram of a configuration of the communication unit 20. The communication unit 20 includes a wireless unit 30 and an interrogation-reply generation detection unit 40. The wireless unit 30 includes a circulator 31 which is a directional coupler having a first terminal a connected to the antenna 13. A second terminal b of the circulator 31 is connected to an output terminal of a power amplification unit 32, while an input terminal of the power amplification unit 32 is connected to an output terminal of an amplitude modulation unit 33. A third terminal c of the circulator 31 is connected to input terminals of multipliers 341 and 342. The multiplier 341 is supplied with an oscillation output from a local oscillator 35. The multiplier 342 is supplied with an output obtained by performing phase-shift on the oscillation output from the local oscillator 35 with a 90-degree phase shifter 36. The amplitude modulation unit 33 is supplied with the oscillation output from the local oscillator 35.

The circulator 31 has a directivity of the signal in order of the second terminal b, the first terminal a and the third terminal c. The output of the power amplification unit 32, which is supplied to the second terminal b, is supplied to the antenna 13 from the first terminal a. A received signal input to the first terminal a from the antenna 13 is supplied to the multipliers 341 and 342 via the third terminal c. The power amplification unit 32 is supplied with a control signal in response to the transmission power determined by the output adjustment unit 23 from the communication control unit 21. Thus the power amplification unit 32 varies amplification degree to alter a magnitude of power transmitted from the antenna 13. Therefore, the transmission power is appropriately set by the control signal from the communication control unit 21. The communication control unit 21 or the entire control unit 29 is equipped with a communication protocol function for RFID tags pursuant to, for example, ISO 18000-6 type C.

In a case of a passive tag, which is a wireless tag without a battery, a non-modulated wave is amplified by the power amplification unit 32, and then an electromagnetic wave is output from the antenna 13 via the circulator 31 to activate the wireless tag. When data is transmitted to the wireless tag, a signal encoded by an encoding unit 44 (hereafter described) is subjected to amplitude modulation using the output of the local oscillator 34 in the amplitude modulation unit 33.

When the signal is received from the wireless tag, the wireless tag controls impedance of the antenna terminal (backscatter) in a state that a non-modulated carrier wave is transmitted from the wireless tag communication device 10, whereby the reflection state is changed and the wireless tag communication device 10 detects the changed state by the antenna 13. The received electromagnetic wave signal is subjected to quadrature demodulation through the circulator to, for example, generate a synchronized clock. A predetermined preamble is detected, and a head frame of the data is detected. The detected head frame is demodulated to obtain the received data. Moreover, it is possible to detect whether there is an error or not using an error-detecting code. In the configuration shown in FIG. 3, it is assumed that the data is correctly received if there is no error occurred in any one of the demodulation into in-phase component and the demodulation into orthogonal component when the quadrature demodulation is carried out.

The interrogation-reply generation detection unit 40 includes an I-signal component demodulation unit 411 that demodulates an I-signal component with a multiplying output of the multiplier 341 as the received signal, and a Q-signal component demodulation unit 412 that demodulates a Q-signal component with a multiplying output of the multiplier 342 as the input signal. Outputs from the I-signal component demodulation unit 411 and the Q-signal component demodulation unit 412 are supplied to a reply signal detection unit 42. The reply signal detection unit 42 detects the reply signal transmitted from the wireless tag based on signals demodulated by the I-signal component demodulation unit 411 and the Q-signal component demodulation unit 412.

The reply signal detection unit 42 is connected to the encoding unit 44 via an interrogation signal generation unit 43. The interrogation signal generation unit 43 generates an interrogation signal to be transmitted to the wireless tag. The encoding unit 44 encodes the interrogation signal generated by the interrogation signal generation unit 43, and sends the encoded interrogation signal to the amplitude modulation unit 33. The I-signal component and the Q-signal component to be input to the I-signal component demodulation unit 411 and the Q-signal component demodulation unit 412 are input to a received signal level detection unit 45. The received signal level detection unit 45 detects received signal levels from the I-signal component and the Q-signal component.

The received signal level detection unit 45 detects which one of the I-signal and the Q-signal has a larger amplitude to output the larger signal. Alternatively, since the I-signal and Q-signal are mutually orthogonal, the received signal level detection unit 45 may detect and output a vector-summed amplitude as represented by the equation (1):

$$\text{Amplitude} = \sqrt{(I^2 - Q^2)} \qquad (1)$$

wherein I and Q represent the amplitude of the I-signal and the amplitude the Q-signal, respectively.

The output of the received signal level detection unit 45 is supplied to the signal strength detection unit 24. The output of the encoding unit 44, i.e. the encoded interrogation signal is input to the amplitude modulation unit 33. The amplitude modulation unit 33 performs amplitude modulation on the interrogation signal by an oscillation signal input by the local oscillator 34. The interrogation signal, i.e. the modulated signal is subjected to power amplification by the power amplification unit 32 and transmitted to the antenna 13 from the circulator 31, thereby sending to the wireless tag.

The interrogation signal generation unit 43 transmits the generated interrogation signal to the encoding unit 44, and transmits a signal indicating that the interrogation signal is generated to the read-state determination unit 22. The replay signal obtained by the reply signal detection unit 42 is transmitted to the notification unit 26. The notification unit 26 notifies the user that the wireless tag has sent the reply by displaying it on the display unit 15, or by making a sound from the audio output unit 261. The reply signal is also transmitted to the read-state determination unit 22.

Figure 4:
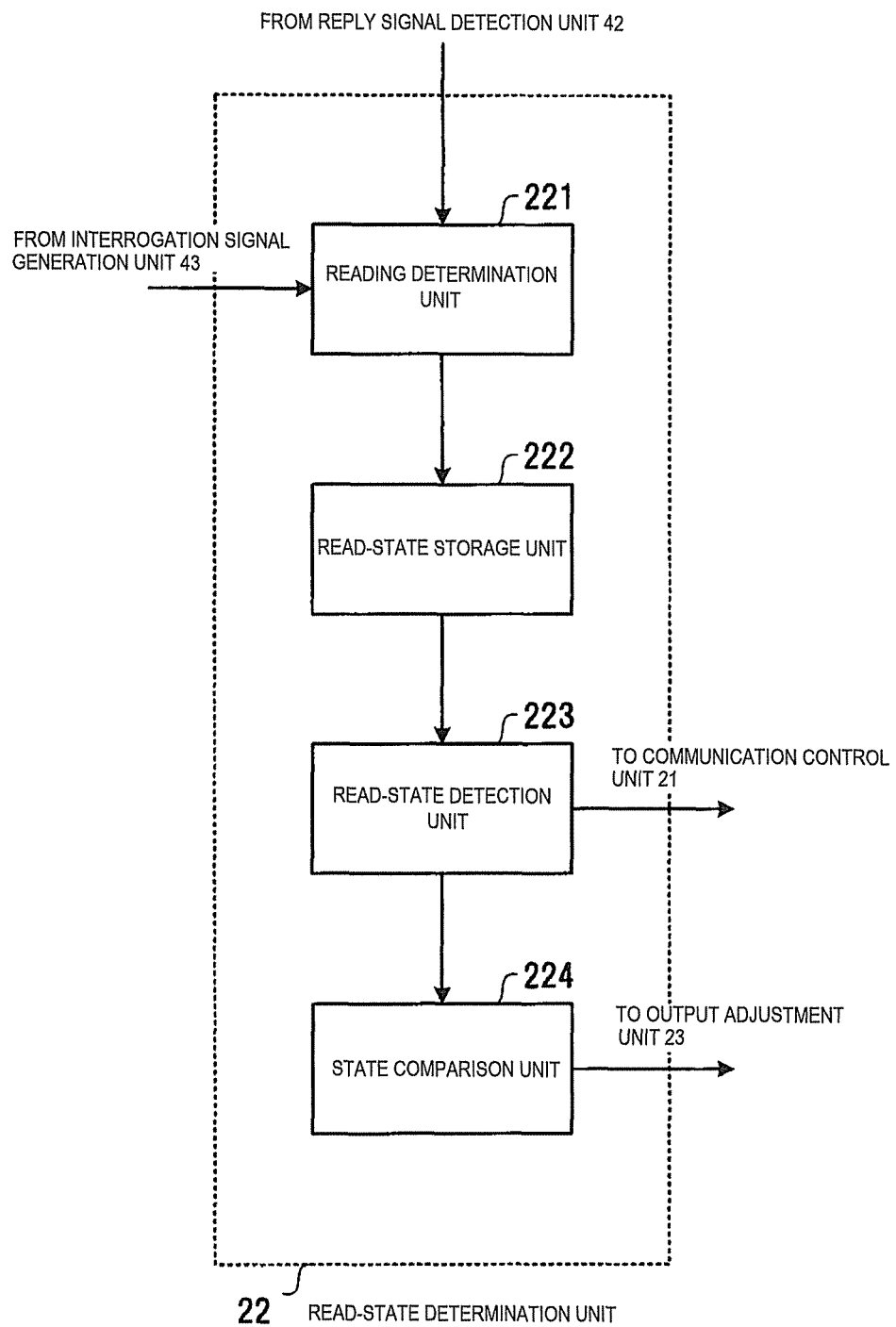
FIG. 4 illustrates a block diagram of a configuration of a read-state determination unit in the embodiment.

FIG. 4 is a block diagram of an exemplary configuration of the read-state determination unit 22. The read-state determination unit 22 includes a reading determination unit 221, a read-state storage unit 222, a read-state detection unit 223 and a state comparison unit 224.

The reading determination unit 221 receives a signal from the reply signal detection unit 42 of the communication unit 20 and a signal from the interrogation signal generation unit 43, thereby determining whether the wireless tag is successfully read or not. Herein the expression "the wireless tag is read" means that the tag information stored in the wireless tag is read. The read-state storage unit 222 stores chronological determination results of the reading determination unit 221. The read-state detection unit 223 detects a read state from the reading determination results stored in the read-state storage unit 222. The state comparison unit 224 compares an output of the read-state detection unit 223 with a preset read state. The detection result of the read-state detection unit 223 is transmitted to the communication control unit 21. The state comparison unit 224 transmits a transmission power adjustment signal to the output adjustment unit 23 if the transmission power is needed to be altered in response to the result of the comparison.

The term "read state" means how many times the information is correctly obtained from the wireless tag within a predetermined time (reading frequency), or a reading rate, or how many times in a row the wireless tag is successfully read and how many times in a row the wireless tag fails to be read. The read state is represented by a detected read-state value R. When the "read state" represents how many times in a row the wireless tag is read and how many times in a row the wireless tag fails to be read, the detected read-state value R is a positive number if the wireless tag is successfully read in a row, and a negative number if the wireless tag fails to be read in a row.

Figure 5:
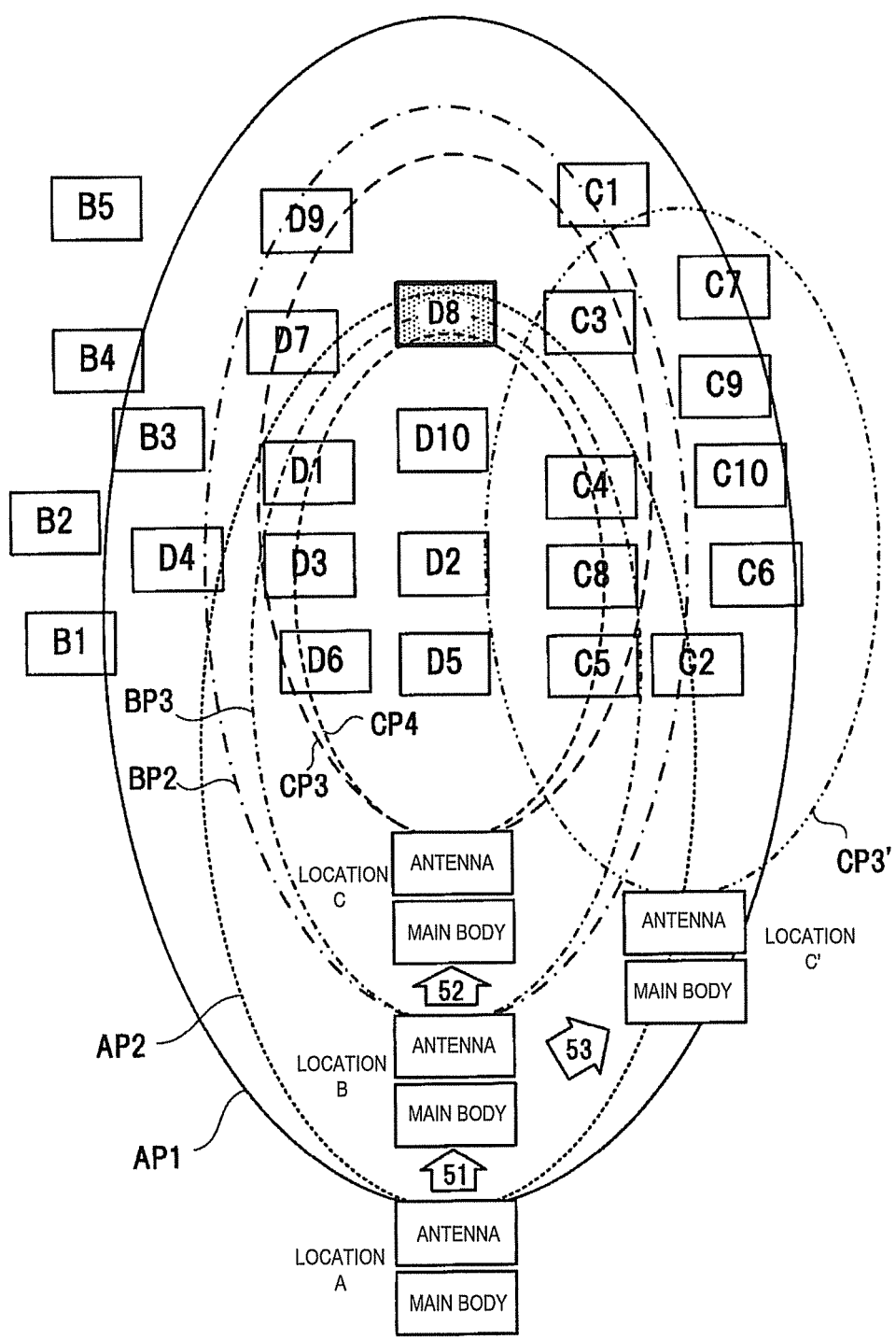
FIG. 5 illustrates an explanatory diagram of change in the communicable range when the wireless tag communication device is moved in the embodiment.

The communication operation performed between the wireless tag communication device 10 and the wireless tag will be described referring to FIG. 5. FIG. 5 is an explanatory diagram of change in a communicable range when the wireless tag communication device 10 is moved. The diagram illustrates a case wherein the wireless tag communication device 10 communicates with, for example, the wireless tag D8 within a region where the wireless tags B1 to B5, C1 to C10 and D1 to D10 are distributed in an unordered manner.

Each of the wireless tags (B1 to B5, C1 to C10 and D1 to D10) stores its own ID information (tag information). In the wireless tag communication device 10, the tag information is input from the input unit 25 when the wireless tag is designated. Hereinafter, wireless tag may be simply called as "tag".

The wireless tag communication device 10 including the main body 11 and the antenna 13 is a movable portable type device. The user shifts from a location A to a location B, and further moves to a location C. A communicable range AP1 is a region where the user is able to wirelessly communicate with the wireless tag with the transmission power P1 at the location A. A communicable range AP2 is a region where the user is able to wirelessly communicate with the wireless tag with the transmission power P2 at the location A. In a similar way, the locations B and C are combined with the transmission powers P2, P3 and P4, and the obtained communicable ranges which allow the communication with the wireless tag in each case are represented by BP2, BP3, CP3 and CP4. When a location C' and the transmission power P3 are combined, a communicable range which allows communication with the wireless tag is represented by CP3'

Figure 6:
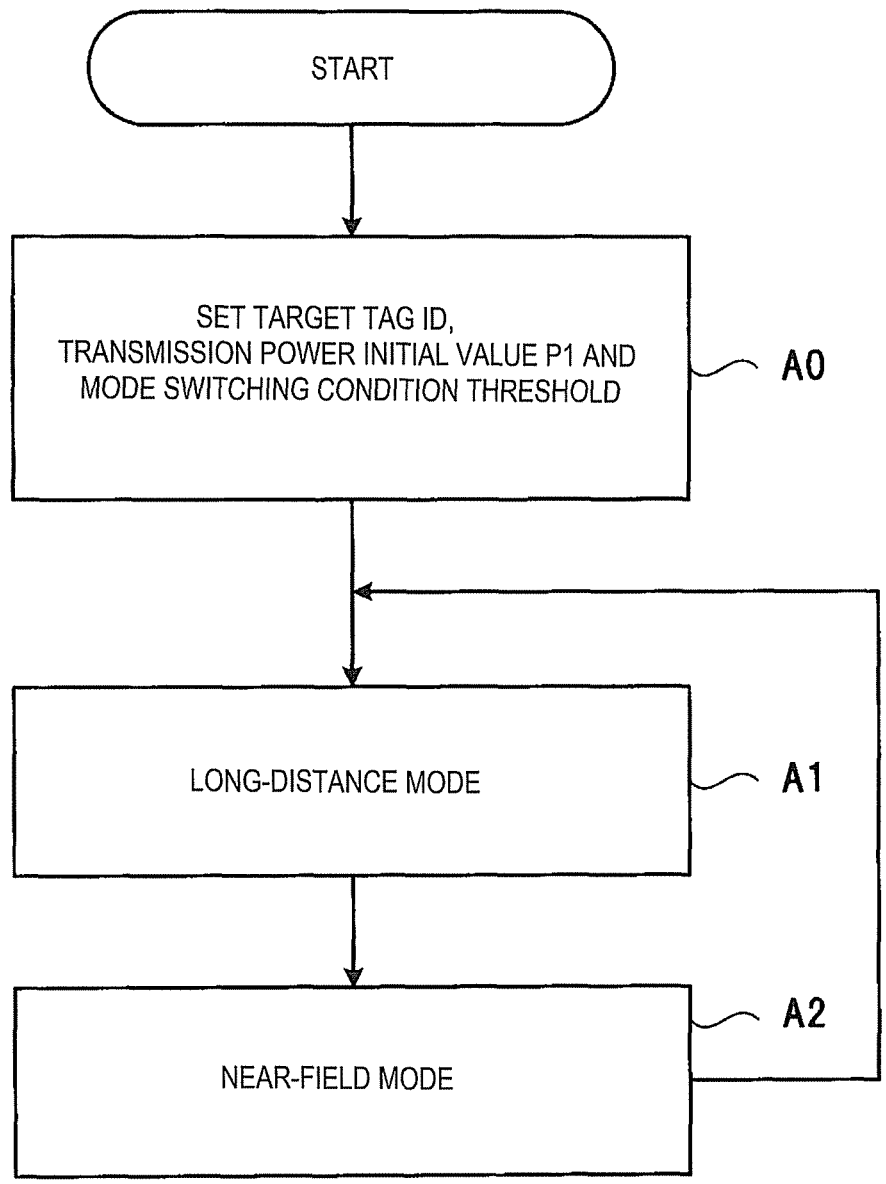
FIG. 6 illustrates a flow chart of operation when the wireless tag is searched for in the embodiment.

FIG. 6 is a flow chart of operation when the wireless tag communication device 10 searches for the wireless tag D8. The user at the location A operates the input keys 14 of the input unit 25 to designate the wireless tag D8 with the wireless tag designation unit 252.

The user starts to search for the wireless tag D8 and read information from this tag with the transmission power P1 at the location A. The communicable range AP1 in this case is a region shown by a thick solid line. The transmission power should be high such that the region when the search and information reading are started will be sufficiently large (power P1).

In Act A0 of FIG. 6, the ID of the wireless tag as a search target and an initial value P1 of the transmission power are set. The communicable range AP1 in this case includes the wireless tag D8. The user is able to read information from the wireless tag D8 by slightly moving the main body 11 and the antenna 13. In the next Act A1, the long-distance mode is set as the search mode to search for the wireless tag. In Act A2, the near-field mode is set as the search mode to search for the wireless tag.

Figure 7:
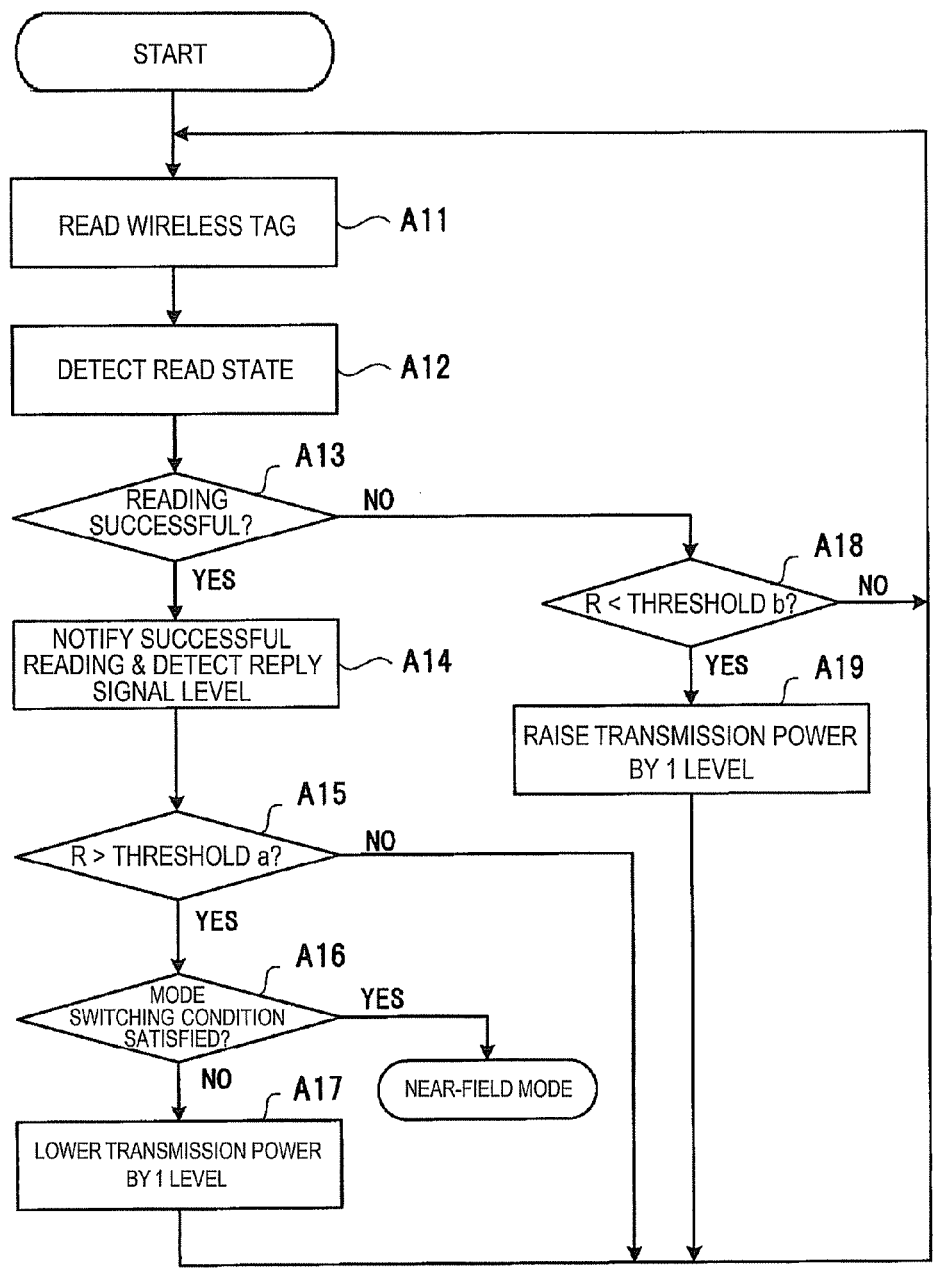

The long-distance mode A1 will be described referring to FIG. 7. FIG. 7 is a flow chart of operation in a long-distance mode when the wireless tag is searched for. In Act A11, the wireless tag is read. In Act A12, the read-state detection unit 223 of the read-state determination unit 22 detects the read state.

In Act A13, the reading determination unit 221 determines whether the determined tag has been successfully read or not. When the reading is successful, the notification unit 26 notifies that the wireless tag has been successfully read, and the signal strength detection unit 24 detects the level of the reply signal from the wireless tag in Act A14. The notification is executed by, for example, making a beeping sound from the audio output unit 261.

In Act A15, the state comparison unit 224 of the read-state determination unit 22 determines whether the detected read-state value R is larger than a first threshold a (a first read-state value) or not. The state comparison unit 224 compares the read state (detected read-state value R) with the threshold a. When the detected read-state value R is not larger than the threshold a (Act A15: NO), the flow returns to Act A11. When the detected read-state value R exceeds the threshold a (Act A15: YES), the read state is determined as "excellent", and the flow advances to Act A16.

When the user holds the antenna 13 in the direction of an arrow 51 at the location A, the wireless tag D8 as the search target is included in the communicable range AP1 and the communication state is excellent, as shown in FIG. 5.

When the detected read-state value R is larger than the threshold a, the communication control unit 21 determines whether a mode switching condition A is satisfied or not in Act A16. If the mode switching condition A is not satisfied in Act A16 (Act A16: NO), the read-state determination unit 22 transmits the transmission power adjustment signal to the output adjustment unit 23 to lower the transmission power by 1 level in Act A17. The flow returns to Act A11.

Meanwhile, when the reading is determined to have been failed in Act A13 (Act A13: NO), the flow advances to Act A18. The state comparison unit 44 of the read-state determination unit 22 determines whether the detected read-state value R is smaller than a second threshold b (a second read-state value) or not. The threshold b is smaller than the threshold a.

In Act A18, when the detected read-state value R is smaller than the threshold b (Act A18: YES), the detected read-state determination unit 22 transmits the transmission power adjustment signal to the output adjustment unit 23 to raise the transmission power by 1 level in Act A19. The flow returns to Act A11. The detected read-state value R happens to become smaller than the threshold b when, for example, the user moves to the location C' whereby communication with the wireless tag D8 becomes unavailable in FIG. 5. In Act A18, when the detected read-state value R is larger than the threshold b (Act A18: NO), the flow returns to Act A11.

The mode switching condition A is satisfied in Act A16 (Act A16: YES), the search mode is shifted to the near-field mode. The notification unit 26 notifies that the near-field mode is activated. As the notification, characters or images indicating that the search mode is shifted to the near-field mode are displayed on the display unit 15. Alternatively, the audio output unit 261 makes a beeping sound.

The mode switching condition A to switch to the near-field mode includes the following four conditions (1) to (4).

(1) A current transmission power value P and a preset transmission power value Pmin are the same when comparing those values. The transmission power value Pmin is set to an output sufficient for almost certainly reading the wireless tag about 50 cm away from the user.

(2) The detected read-state value R is equal to or larger than a third threshold c while satisfying the condition (1) (the relationship between b and c is satisfies c>b).

(3) The signal strength detection unit 24 detects the reply signal level being equal to or larger than a fourth threshold d. The fourth threshold d is preferred to be set to a reply signal level when the wireless tag about 50 cm away from the user is read.

(4) Drssi, which is calculated by the signal strength calculation unit 241 of the signal strength detection unit 24, is equal to or smaller than a fifth threshold e. The fifth threshold e is preferred to be set to a value which is sufficiently small compared with the Drssi when the user is several meters away from the wireless tag.

The communication control unit 21 determines that the mode switching condition A is satisfied when any one of the above-mentioned conditions is met. Alternatively, the communication control unit 21 may be set with one of the above-mentioned conditions (1) to (4) as an essential condition and determine that the mode switching condition A is satisfied when the set condition is met.

By setting as stated above, it is possible to suppress reflection influence from articles surrounding the wireless tag. Moreover, since the transmission power is sufficient to read the wireless tag, it is able to suppress fluctuation in the reply signal level caused by ambient environmental influences in the near-field mode to be described below, whereby more stable reading is available.

In this way, the signal is transmitted at the location A with the initial transmission power P1. When the read state is excellent, the transmission power is gradually reduced. When the transmission power is so small that the detected read-state value R is smaller than the threshold b, the transmission power is raised by 1 level. Therefore, when the initial transmission power P1 is transmitted at the location A, the communicable range is AP1. After the transmission power is gradually reduced, the communicable range shifts to the communicable range AP2 in which the transmission power is enough to reach the wireless tag D8 (in this case, the transmission power is P2).

In FIG. 5, when the user moves to the location B following the arrow 51, the communicable range is BP2. Since the location B is closer to the wireless tag D8, the transmission power P2 is capable of covering other tags further than the wireless tag D8. It corresponds to the communicable range BP2 in FIG. 5.

When the flow starts from Act A11 in the flow chart of FIG. 7 under this situation, while the read state is excellent, the flow enters into a route from Act A12 to Act A17 unless the mode switching condition A is satisfied in Act A16, and returns to Act A11 again; thus the transmission power is reduced. Meanwhile, since the transmission power is raised by 1 level when the detected read-state value R is smaller than the second threshold b (i.e., the read state is bad) (Act A13→A18→A19→A11), the transmission power becomes P3 and the communicable range shifts to BP3 in which the radio wave barely reaches the wireless tag D8 from the location B.

The user moves to the location C following the arrow 52, and the search for the wireless tag D8 continues at the location C with the transmission power P3. In this case, the communicable range is CP3. The transmission power is gradually reduced by 1 level in the same manner at the location C to the transmission power P4 which allows the radio wave to barely reach the wireless tag D8. The communicable range shifts to CP4. If the user gets closer to the wireless tag D8 with the wireless tag communication device 10 including the main body 11 and the antenna 13, it is possible to reduce the transmission power within a range capable of communicating with the wireless tag D8.

In Act A14, increase or decrease in the transmission power may be notified in addition to the successful reading. For example, the current transmission power value is displayed on a display screen of the display unit 15, or a sound such as buzzer is output from the audio output unit 261 when the transmission power increases or decreases. When a sound such as beeping is output from the audio output unit 261 in accordance with the successful reading, the frequency of outputting the sound or the sound pitch may be changed in response to the transmission power. For example, the smaller the transmission power is, the higher the pitch is.

As referred to above, the user is able to detect the direction of the wireless tag as the search target since the communication state with the wireless tag is notified by making a beeping sound or displaying it on the display unit 15. Under a situation that the user remains at the location A, the transmission power is reduced such that the read-state value is equal to or smaller than the threshold a when the transmission power becomes P2, as shown in the flow chart of FIG. 7. However, if the user moves in the detected direction, the user can gets close to the wireless tag D8 by passing through the locations B and C as shown in FIG. 5, while maintaining the excellent read state. When the mode switching condition A is satisfied the search mode is shifted to the near-field mode.

When the output adjustment unit 23 decreases the transmission power faster than the user moves in the direction where the wireless tag has been detected, the read-state value cannot exceed the threshold a. When the read-state value is in a range from the first threshold a to the second threshold b, the transmission power is not changed. Therefore, when the user remains at the location A, the transmission output is maintained.

Sometimes the user might head in a direction (for example, indicated by an arrow 53) different from the direction of the wireless tag D8 as the search target. When the user moves to the location C' as shown in FIG. 5, the read-state value falls below the second threshold b. When the read-state value falls below the threshold b, the read-state determination unit 22 determines that the wireless tag D8 as the search target gets lost. Thus the output adjustment unit 23 raises the transmission power by 1 level to broaden the communicable range.

By varying the transmission power in response to the read state, the user can get close to the wireless tag D8. The search mode is shifted from the long-distance mode to the near-field mode thereby identifying the wireless tag D8.

Figure 8:
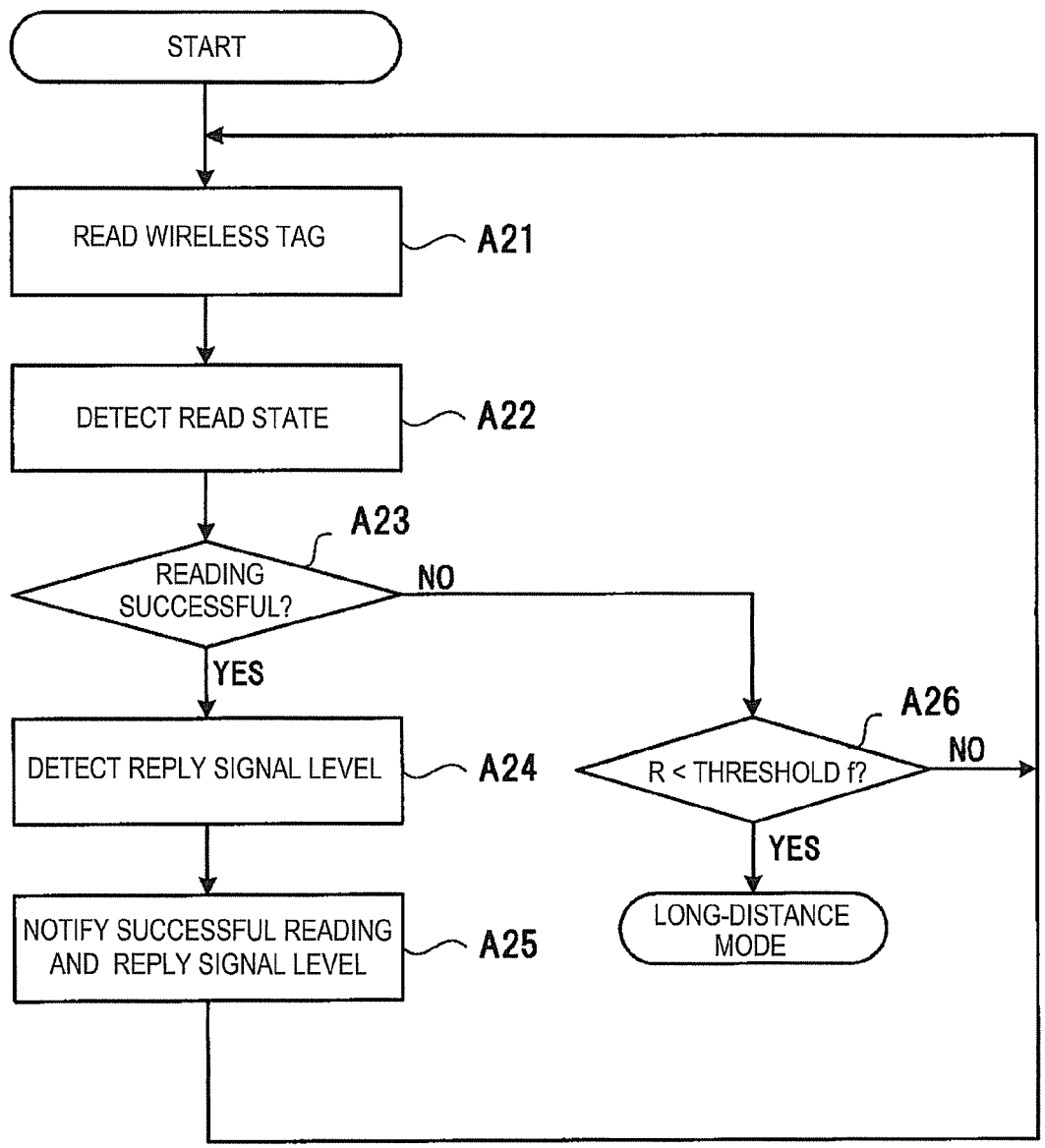

The operation in the near-field mode will be described referring to FIG. 8. FIG. 8 is a flow chart of operation in the near-field mode when the wireless tag is searched for.

In Act A21, the wireless tag is read. In Act A22, the read-state detection unit 223 of the read-state determination unit 22 detects the read state of the wireless tag. In Act A23, the reading determination unit 221 outputs the determination result (whether the wireless tag has been successfully read or not). When the reading is successful (Act A23: YES), the signal strength detection unit 24 detects the level of the reply signal from the wireless tag in Act A24.

In Act A25, the notification unit 26 performs a notification that the reading is successful, and a notification in response to the reply signal level detected by the signal strength detection unit 24. As the notification, a notice may be displayed on the display unit 15, or the audio output unit 261 may output the sound. For example, when the reading is successful, the audio output unit 261 outputs a beeping sound, and the reply signal level is displayed on the display screen of the display unit 15. The reply signal level may be represented by numeric characters, a level meter, or a diagram such as a circle in response to the actual level. Alternatively, the frequency of outputting the sound or the sound pitch which indicates the successful reading may be changed in response to the reply signal level.

When the reading is determined to have been failed in Act A23 (Act A23: NO), the flow advances to Act A26. The state comparison unit 224 determines that the detected read-state value R is smaller than a sixth threshold f (the threshold f<the threshold a) or not. After the comparison, when the detected read-state value R is smaller than the threshold f (Act A26: YES), it is determined that the communication state is bad. The search mode returns back to the long-distance mode. This situation corresponds to a situation in which the user has headed in the direction different from the direction of the wireless tag D8 as the search target, e.g. when the user moves to the location C' from the location C shown in FIG. 5.

In the near-field mode, since the transmission power is fixed, the wireless tag D8 cannot be read. Thus the reply signal level cannot be detected. In this case, the detected read-state value R becomes smaller than the threshold f, the search mode returns back to the long-distance mode. The transmission power increases in Act A19 shown in FIG. 7, thus the reading becomes available. When the mode switching condition A is satisfied again, the search mode returns back to the near-field mode.

Meanwhile, when the detected read-state value R is equal to or larger than the threshold f (Act A26: NO), the flow returns to Act A21. The Acts A21 to A25 are repeated until the user identifies the tag.

As stated above, in the near-field mode, when the wireless tag D8 as the search target is successfully read, the notification in response to the reply signal level is performed in addition to the notification that reading is successful. For example, when the reply signal level is displayed as a number on the display screen of the display unit 15, the user heads in a direction in which the number become larger to get close to the wireless tag D8 as the search target, thereby easily identifying the wireless tag.

Immediately after the search for the wireless tag is started, the search mode is set to the long-distance mode. The communicable range is controlled by varying the transmission power in response to the read state of the wireless tag. If the initial value P1 of the transmission power is set to a large value, the user can confirm the direction of the wireless tag depending on the notification of successful reading at a position several meters away from the wireless tag, and can get close to the target wireless tag.

When the mode switching condition A is satisfied, the search mode is shifted to the near-field mode, and the notification is executed in response to the reply signal level. The user is already close to the target wireless tag (within several dozens of centimeters) in the long-distance mode. The transmission power has been reduced and is not unnecessarily high. Thus there is a little fluctuation in the reply signal level caused by ambient environmental influences, and the user can easily find a direction in which the reply signal level is higher. Thereby the user is able to readily identify the wireless tag.

Hereinafter, a reason why the transmission power is fixed in the near-field mode will be described. In the near-filed mode, the tag information is stably read from the wireless tag by fixing the transmission power, whereby the signal strength of the reply signal (RSSI) can be detected from the wireless tag. If the fixed transmission output in the near-field mode is set to an output sufficient for stable reading when, for example, the user is about 50 cm away from the wireless tag, the reply signal strength (RSSI) is higher as the user come closer to the wireless tag (or as the antenna faces in the direction of the wireless tag). Thus the user can recognize that he/she is getting close to the wireless tag.

Even if the wireless tag is hard to be read because the type of the tag or installing environment is different, the transmission output in the near-field mode is set to be higher than the minimum output sufficient for reading the wireless tag. Therefore the user can easily read the tag and detect the reply signal strength (RSSI), except for a wireless tag that is nearly impossible to be read. When the wireless tag is easy to be read, though a range that the wireless tag is readable becomes broader, it is possible to cut down the range more sufficiently than when the search is started. Thereby the user is able to identify the tag depending on the reply signal strength (RSSI).

If the transmission output is reduced in the near-field mode as in the long-distance mode, the user is needed to get close to the tag in response to the transmission output (if the user does not get close, the tag cannot be read). That is, there is no difference between the near-field mode and the long-distance mode. If the transmission output is reduced to a certain value, the tag cannot be read even if the user gets close to the wireless tag such that the reply signal strength (RSSI) cannot be obtained. In such a case, if the transmission output is controlled to be varied, the tag alternates between a readable state (in this case, RSSI is XX) and an unreadable state, and RSSI also alternates between "XX" and "undetected". Thus the user is unable to identify the wireless tag. Therefore, the transmission output should be fixed in the near-field mode.

Figure 9A:
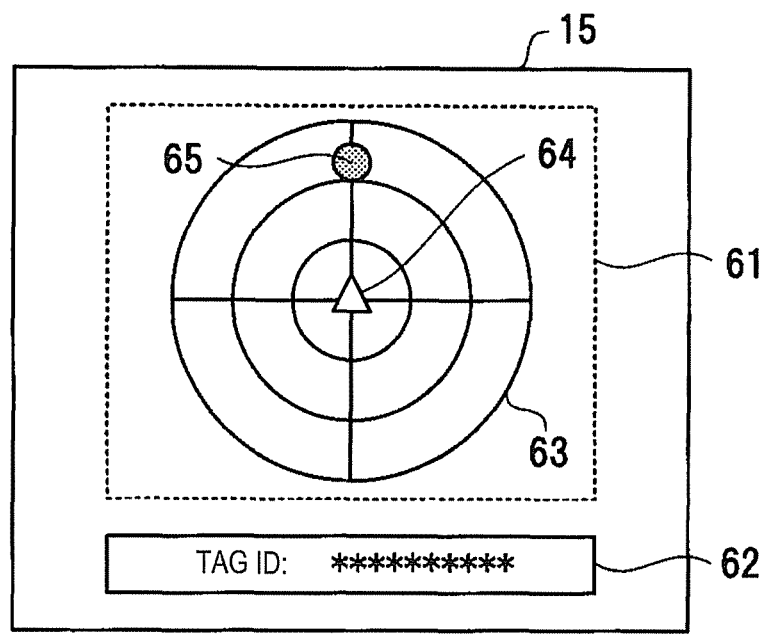
FIG. 9A illustrates an explanatory diagram of an exemplary display screen on a display unit related to the embodiment.

Next, the screen to be displayed on the display unit 15 during the search will be described. FIG. 9A is an exemplary display screen to be displayed on the display unit 15 during the search. The display screen displays a relative distance between the main body 11 and the target wireless tag, a search assistance image 61 which indicates information corresponding to the reply signal level, and a tag ID image 62 which indicates ID information of the target wireless tag. The search assistance image 61 includes a scale 63 indicating the relative distance and a degree of the reply signal level, a self-location image 64 which is displayed at the center of the scale 63 and represents the main body 11, and a tag image 65 which indicates the target wireless tag. The radius of concentric circle of the scale 63 indicates the relative distance between the main body 11 and the target wireless tag.

FIG. 9A is the display screen when the search is started and the target wireless tag is read. The search mode immediately after the search is started is the long-distance mode. The relative distance is calculated from the transmission power. The tag image 65 is displayed at a location away from the center of the scale 63 immediately after the search is started. As the transmission output is reduced in Act A17 of FIG. 8, a displaying location of the tag image 65 comes closer to the center of the scale 63.

Figure 9B:
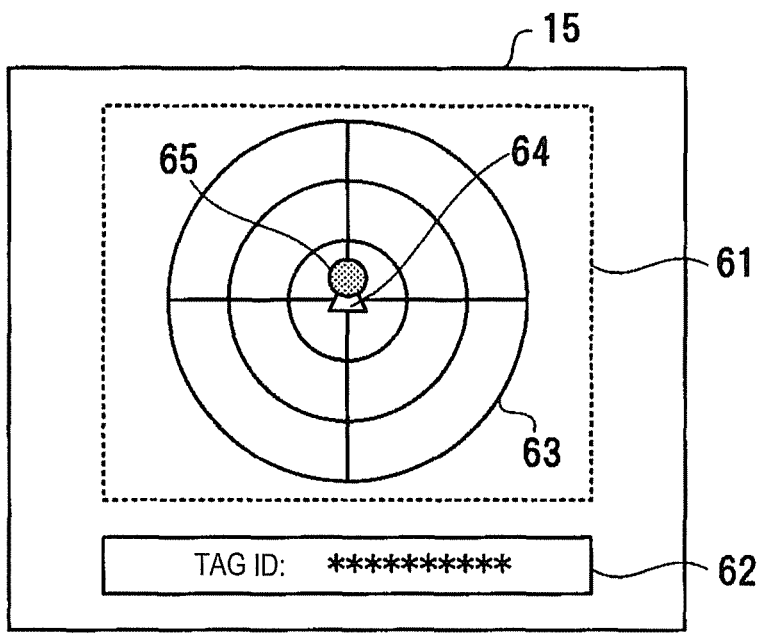
FIG. 9B illustrates an explanatory diagram of an example of change in a display state in the display unit.

FIG. 9B is a display screen just before the mode switching condition A is satisfied in Act A16 of FIG. 8. The tag image 65 is overlapped with the self-location image 64, which means that the user gets close to a vicinity of the target wireless tag. When the mode switching condition A is satisfied, the search mode is shifted to the near-field mode.

Figure 9C:
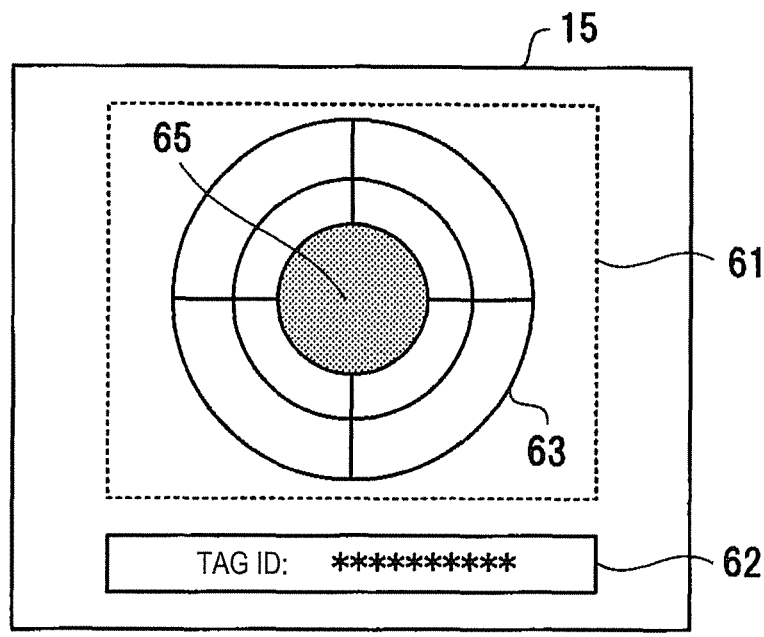
FIG. 9C illustrates an explanatory diagram of another example of change in a display state.

FIG. 9C is a display screen in the near-field mode. The tag image 65 is displayed at the center of the scale 63, and has a larger size (radius) in response to a degree of the reply signal level. The radius of concentric circle of the tag image 65 indicates the degree of the reply signal level.

Based on the indications shown in FIGS. 9B and 9C, the user of the wireless tag communication device 10 is able to recognize whether he/she gets close to or walks away from the target wireless tag based on the displayed location of the tag image 65 in the long-distance mode. In the near-field mode, the user is able to recognize the degree of the reply signal level based on the size of the tag image 65. The user is also able to recognize that the target wireless tag is present in the direction in which the tag image 65 becomes larger.

FIGS. 9A to 9C display the relative distance between the main body 11 and the target wireless tag and the degree of the reply signal level within one display region, but may display the relative distance and the degree of the reply signal level separately.

Figure 10:
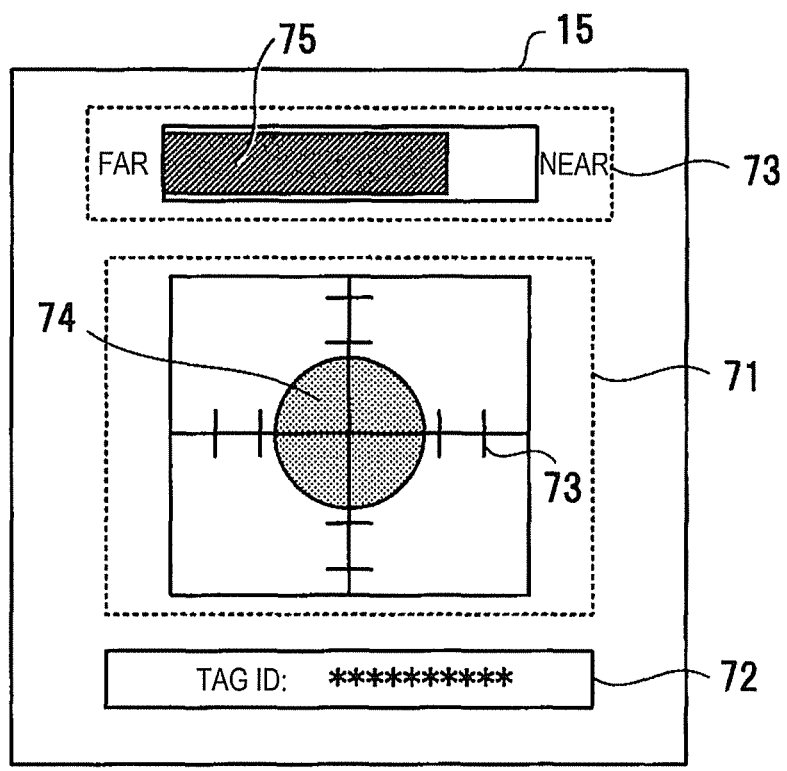
FIG. 10 illustrates an explanatory diagram of still another exemplary display screen.

FIG. 10 is an explanatory diagram of another exemplary display screen on the display unit 15. It indicates an exemplary display screen in which the relative distance and the degree of the reply signal level are displayed separately. The display screen includes a reply signal level image 71 which indicates the reply signal level, a tag image 72 which indicates ID information of the target wireless tag, and a level meter 73 which indicates the relative distance.

The reply signal level image 71 includes a scale 73 and a circle 74 which indicates the degree of the reply signal level. The circle 74 has a lager radius as the reply signal level becomes higher. The level meter 73 indicates the relative distance with the length of a bar 75. The longer the bar 75 is, the shorter the relative distance between the main body 11 and the target wireless tag is.

The user of the wireless tag communication device 10 is able to confirm the relative distance with the level meter 73 in the long-distance mode, and the distance to the target wireless tag and the direction of such a tag by checking the reply signal level image 71 in the near-field mode.

As stated above, the first embodiment is able to provide the wireless tag communication device which assists to search for the wireless tag until the wireless tag is identified starting from a location several meters away from the wireless tag as the search target.

The first embodiment describes the wireless tag communication device 10 including the main body 11 and the antenna 13 connected to the main body 11 via the antenna cable 12 as shown in FIG. 1A, but the wireless tag communication device 10 may include the main body 11 which has only a function of the communication unit 20 shown in FIG. 2 and is connected to the antenna 13, and a controller which includes the functions other than the communication unit 20 and the antenna 13 shown in FIG. 2.

Examples of the controller include a personal computer or a potable terminal such as a smartphone. The connection between the main body 11 and the controller can be established by a wired connection with a LAN cable or an USB cable, or by a wireless connection with wireless LAN or Bluetooth (trademark).

Second Embodiment

A wireless tag communication device related to the second embodiment will be described below.

FIG. 11 is a block diagram of a wireless tag communication system related to the second embodiment. This exemplary wireless tag communication system includes the wireless tag communication device 10 and a host device (server) 100. The components having the same functions as in FIG. 2 are represented by the same reference symbols.

The wireless tag communication device 10 includes the antenna 13, the communication unit 20, the communication control unit 21, the input unit 25, the notification unit 26 and the power unit 28. The host device 100 includes the entire control unit 29, the read-state determination unit 22, the output adjustment unit 23 and the signal strength detection unit 24. The signal strength detection unit 24 includes the signal strength calculation unit 241 and the signal strength storage unit 242. The entire control unit 29 includes the CPU 291.

The entire control unit 29 constitutes the computer, and controls the operation of the host device 100. The entire control unit 29 also controls each unit of the wireless tag communication device 10, such as the communication control unit 21, to control the whole of the wireless tag communication device 10. Moreover, the entire control unit 29 includes the storage unit 292 composed of the ROM and the RAM. The ROM of the storage unit 292 stores in advance a program and setting data used by the entire control unit 29, etc. Variable data is temporarily written to the RAM by the entire control unit 29.

The host device 100 and the wireless tag communication device 10 include the interface units (I/F units) 271 and 272. The I/F units 271 and 272 are connected via a communication line 80 to establish communication between the wireless tag communication device 10 and the host device 100. The communication line 80 may be wired or wireless.

The signal strength storage unit 242 of the host device 100 stores the reply signal intensities when reading the tag transmitted from the communication unit 20 of the wireless tag communication device 10. The signal strength calculation unit 241 calculates the difference Drssi between the maximum signal strength and the minimum signal strength from the signal intensities stored in the signal strength storage unit 242 during a predetermined period. The calculation result is transmitted to the communication control unit 21. The read-state determination unit 22 detects a read state based on the read tag information transmitted from the communication unit 20, and transmits the detection result to the communication control unit 21. The read-state determination unit 22 transmits the transmission power adjustment signal to the output adjustment unit 23 when it has been determined that the output adjustment is necessary from the read state. The output adjustment unit 23 determines the transmission power from the transmission power adjustment signal and transmits transmission power information to the communication control unit 21.

The communication control unit 21 switches between the long-distance mode function and the near-field mode function based on the read state of the wireless tag, the transmission power and the signal strength in order to control the communication unit 20. The communication control unit 21 also transmits a control signal to the communication unit 20 in response to the transmission power determined by the output adjustment unit 23.

The wireless tag communication system shown in FIG. 11 basically operates in the same way as in FIG. 2. However, the host device performs operations such as control of the wireless tag communication device 10, storage of information read from the wireless tag and calculation of the read information, while the calculation result is processed to be displayed in the wireless tag communication device 10.

The server has been described as the host device 100. However, the host device 100 may include a personal computer such as a laptop, a smartphone (multifunctional mobile phone), a tablet terminal, etc. in addition to the server.

The second embodiment is able to assist to search for the wireless tag until the wireless tag is identified starting from a location several meters far away from the wireless tag as the search target.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the inventions.

What is claimed is:

1. A wireless tag communication device which communicates with a wireless tag, comprising:
   a communication unit that designates a target wireless tag to read tag information stored in the wireless tag;
   a read-state determination unit that determines a read state of the tag information read by the communication unit;
   an output adjustment unit that varies a radio wave output to be transmitted to the wireless tag in response to the result of the determination by the read-state determination unit;
   a signal strength detection unit that detects the received signal strength indicator of a reply signal received from the wireless tag via the communication unit; and
   a control unit that switches the operation mode of the communication unit between a long-distance mode to communicate with the wireless tag while the output adjustment unit varies the radio wave output and a near-field mode to communicate with the wireless tag while the signal strength detection unit that detects the signal strength.

2. The device according to claim 1, further comprising a notification unit that notifies the read state of the wireless tag in response to the signal strength detected by the signal strength detection unit in the near-field mode.

3. The device according to claim 1, wherein the control unit switches the operation mode from the long-distance mode to the near-field mode when the radio wave output adjusted by the output adjustment unit reaches a preset threshold.

4. The device according to claim 1, wherein the signal strength of the reply signal from the wireless tag is also detected in the long-distance mode and the control unit switches the operation mode from the long-distance mode to the near-field mode when the signal strength detected by the signal strength detection unit is larger than a preset threshold.

5. The device according to claim 1, further comprising a storage unit which stores the signal strength detected by the signal strength detection unit,
   wherein the signal strength of the reply signal from the wireless tag is also detected in the long-distance mode and the control unit switches the operation mode from the long-distance mode to the near-field mode when the difference between the signal intensities stored in the storage unit during a predetermined period is equal to or smaller than a preset value.

6. A non-transitory storage medium encoded with a computer readable program to communicate with a wireless tag, and read and process tag information stored in the wireless tag, the program causing a computer to execute:

a communication function adapted to designate a target wireless tag to read tag information stored in the wireless tag;

a read-state determination function adapted to determine a read state of the tag information;

an output adjustment function adapted to vary a radio wave output to be transmitted to the wireless tag in response to the result of the determination of the read state;

a signal strength detection function adapted to detect the signal strength of a reply signal received from the wireless tag; and a control function adapted to switch the read operation mode in the communication function between a long-distance mode to communicate with the wireless tag while the radio wave output is varied and a near-field mode to communicate with the wireless tag while the signal strength of the reply signal is detected.

* * * * *